United States Patent [19]
Koyanagi et al.

[11] 3,870,702
[45]*Mar. 11, 1975

[54] CELLULOSE ETHER COMPOSITIONS USEFUL AS ENTERIC COATINGS

[75] Inventors: Shunichi Koyanagi; Kinya Ogawa; Yoshiro Onda; Akira Yamamoto, all of Naoetsu, Japan

[73] Assignee: Shinetsu Chemical Company, Tokyo, Japan

[*] Notice: The portion of the term of this patent subsequent to Jan. 23, 1990, has been disclaimed.

[22] Filed: Nov. 9, 1973

[21] Appl. No.: 414,186

Related U.S. Application Data

[63] Continuation of Ser. No. 171,005, Aug. 11, 1971, abandoned, which is a continuation-in-part of Ser. No. 118,555, Feb. 24, 1971, Pat. No. 3,712,886.

[30] Foreign Application Priority Data
Mar. 19, 1971  Japan.............................. 46-15953

[52] U.S. Cl................. 260/226, 106/187, 106/188, 106/189, 106/190, 106/191, 106/197 R, 260/225, 260/231 R, 424/362
[51] Int. Cl.............................................. C08b 11/00
[58] Field of Search........................ 260/226, 231 A

[56] References Cited
UNITED STATES PATENTS

| | | | |
|---|---|---|---|
| 3,629,237 | 12/1971 | Koyanagi et al.................... | 260/226 |
| 3,712,886 | 1/1973 | Koyanagi et al.................... | 260/226 |
| 3,789,117 | 1/1974 | Tsujino.............................. | 260/226 |

*Primary Examiner*—Ronald W. Griffin
*Attorney, Agent, or Firm*—Toren and McGeady

[57] ABSTRACT

Tetrahydrophthalic acid monoester or hexahydrophthalic acid monoester of a cellulose ether represented by the general formula:

$$R^1{}_m R^2{}_n A,$$

wherein $R^1$ is a hydroxyalkyl radical of three or four carbon atoms, $R^2$ is a hydrogen or an alkyl radical of one or two carbon atoms, $m$ and $n$ are positive integers, and A is a cellulose residue, which monoesters are readily soluble in weak alkaline solutions, besides possessing high solubility in organic solvents and excellent resistance to water; they are useful as enteric coatings, and drugs coated with them can stand long storage and are readily soluble upon passing into the intestines, thereby enhancing the effect of the drugs.

19 Claims, No Drawings

CELLULOSE ETHER COMPOSITIONS USEFUL AS ENTERIC COATINGS

This is a continuation of application Ser. No. 171,005 filed Aug. 11, 1971, now abandoned, which, in turn, is a continuation-in-part of Ser. No. 118,555 filed Feb. 24, 1971, now U.S. Pat. No. 3,712,886.

BACKGROUND OF THE INVENTION

The invention relates to compositions useful as enteric coatings which are prepared from the tetrahydrophthalic acid monoester or hexahydrophthalic acid monoester of cellulose ether or a mixed ester of tetrahydrophthalic acid or hexahydrophthalic acid and another dibasic acid or tribasic acid of cellulose ether, as principal components.

Properties generally required of enteric coating agents for medicaments are insolubility in the stomach, solubility in the intestines, intoxicity in itself, and high moisture permeability resistance and stability, besides a superior coating property. For such purpose, cellulose acetate phthalate (hereinafter abbreviated as CAP) has been widely employed. Other well known cellulose ethers and ether derivatives are methylcellulose phthalate (MCP), hydroxyethylethylcellulose phthalate (HEECP), cellulose acetate tetrahydrophthalate (CATHP) and cellulose acetate hexahydrophthalate (CAHHP). But CAP does not possess moisture permeability resistance and stability, so that during storage, it is liable to be hydrolyzed by the moisture contained in the air, thereby isolating acetate acid and greatly reducing the commercial value of the medicament. As to MCP and HEECP, their solubilities in ordinary organic solvents such as acetone are not good enough, so that their coating methods are limited. Furthermore, they have poor moisture permeability resistances, which are apt to cause the medicaments treated with them to be degenerated while they are stored. It is true that the moisture permeability resistance of CATHP and CAHHP have been somewhat improved, but their stabilities are as poor as ever and just like CAP, they are apt to isolate acetic acid and reduce the commercial values of the medicaments.

STATEMENT OF THE INVENTION

An object of the invention is to provide an excellent enteric coating agent free from such disadvantages as given above, which is mostly composed of the tetrahydrophthalic acid monoester or hexahydrophthalic acid monoester of a cellulose ether represented by the general formula:

$$R^1{}_m R^2{}_n A$$

(where $R^1$ is a hydroxyalkyl radical having three or four carbon atoms, $R^2$, a hydrogen atom or an alkyl radical of one or two carbon atoms, A, a cellulose residue, and $m$ and $n$ are positive integers,) or a mixed ester of tetrahydrophthalic acid or hexahydrophthalic acid and another dibasic acid or tribasic acid of said cellulose ether.

To give a more detailed description of the invention, it is based on our observations that said monoester of cellulose ether, which is the principal component of said coating agent, has a higher solubility in organic solvents than generally the employed MCP or HEECP does, and that, in particular, unlike CAP, it is soluble in alcohol and possesses little toxicity, so that the coating agent of the invention can be applied to the medicament safely with a simple coating device. What is better, when the degree of the substitution of hydroxyalkyl radical having three or four carbon atoms is increased, the cellulose ether will be improved in moisture permeability resistance as well as in solubility in organic solvents, so that the medicament coated with such a coating agent, especially with the tetrahydrophthalic acid monoester or hexahydrophthalic acid monoester of hydroxypropyl cellulose, is provided with more than ten times as much moisture permeability resistance as a CAP-coated one is; consequently, the former will never be decomposed or give out a bad smell or deteriorate the base during storage, even if it should come in contact with the moisture contained in the air.

The monoester of the cellulose ether represented by the general formula given above is the principal component of the coating agent of the present invention and is obtained by reacting, in a reaction medium of glacial acetic acid or propionic acid, cellulose ethers exemplified by hydroxypropyl cellulose (HPC), hydroxybutyl methylcellulose (HBMC), hydroxypropyl methylcellulose (HPMC), hydroxybutyl cellulose (HBC) and hydroxypropyl ethylcellulose (HPEC), with the tetrahydrophthalic anhydride or hexahydrophthalic anhydride or a mixture of either of them and a dibasic acid anhydride or tribasic acid anhydride such as phthalic anhydride, succinic anhydride or trimellitic anhydride, in the presence of an alkali metallic salt of acetic acid, such as anhydrous sodium acetate, acting as a catalyst. When such a cellulose ether is esterified, it turns into a monoester, with one of the acid radicals in said acid anhydride forming an ester together with a hydroxyl radical in the cellulose ether represented by the above-given general formula, $$R^1{}_m R^2{}_n A$$

and the remaining acid radical becoming a free carboxyl radical. Besides the merits described above, the product possesses such characteristics as given below:

1. Fine solubility in artificial intestinal fluid of pH 8.3, although no solubility in artificial gastric fluid of pH 1.2.

2. The product whose M.S. (the number of the substitution moles per anhydrous glucose unit) of the tetrahydrophthalyl radical or hexahydrophthalyl radical is at least 0.8, is soluble in McIlvaine's buffer solution having a pH of 7.0 or above, so that the velocity at which it dissolves in the duodenum and in the upper part of the small intestines is low, making it useful as a coating agent for a medicament which takes effect slowly.

3. When the M.S. of the tetrahydrophthalyl radical or hexahydrophthalyl radical is 0.8 or below, or the monoester is composed of a tetrahydrophthalyl radical or hexahydrophthalyl radical and another dibasic or tribasic radical such as the phthalyl radical, succinyl radical and trimellityl radical, the product can be made soluble in McIlvaine's buffer solution having a pH of from 4.5–7.0 upward to alkaline side. Consequently, by choosing the proper M.S. values or proper ratio of the substitution radicals, the product can be made soluble in the McIlvaine's buffer solution of any desired pH value whose lowest limit is between 4.5 and 7.0. For example, mixed monoesters containing tetrahydrophthalyl radicals whose M.S. is 0.41 and phthalyl radicals whose M.S. is 0.40 are soluble in the McIlvaine's buffer solution having a pH value of 6.0 and up. Therefore if a proper choice is made of the M.S. values in the preparation of the coating agent, the medicament coated with such a coating agent can be made to take effect either immediately or at any desired time.

4. By a combined use of the coating agents described in 2 and 3, the medicament may be easily made to take effect continuously.

From cellulose ethers represented by the above-given general formula are prepared cellulose ether derivatives, whose physical properties, such as, solubility in organic solvents and alkali, moisture permeability resistance and stability are greatly affected by the amount of the substitution radicals contained in the cellulose, so that when hydroxyalkyl cellulose is to be employed, such hydroxyalkyl cellulose as contains hydroxyalkyl radicals whose M.S. is from 0.2 to 5.0 or more preferably from 1.0 to 4.0, and when hydroxyalkylalkyl cellulose is to be employed, such hydroxyalkylalkyl cellulose as contains hydroxyalkyl radicals whose M.S. is at least 0.02, or more preferably at least 0.05 should be selected. Furthermore, in the case of hydroxyalkylalkyl cellulose it is desirable that the total M.S. of hydroxyalkyl radicals and of alkyl radicals contained in it is from 0.5 to 5.0, or more preferably from 1.0 to 4.0. Tetrahydrophthalyl radicals or hexahydrophthalyl radicals bonded by esterification to these cellulose ethers had better an M.S. of at least 0.20, or more preferably at least 0.30. What is desired of mixed monoesters containing, besides tetrahydrophthalyl radicals and hexahydrophthalyl radicals, phthalyl radicals, succinyl radicals, or trimellitic radicals, is that they contain hexahydrophthalyl radicals or tetrahydrophthalyl radicals whose M.S. is at least 0.15 and the substitution acyl radicals whose total M.S. is at least 0.30. If the amounts of tetrahydrophthalyl radicals, hexahydrophthalyl radicals and the substitution acyl radicals are not up to the above-given standards in M.S., the solubility in organic solvents and alkali, the moisture permeability resistance, and the stability of the product will not be satisfactory, and the product will fail to work as a superior enteric coating agent for medicaments.

The enteric coating agent of the invention had better have such a polymerization degree as that its 15% acetone-ethanol (1:1) solution will give viscosity of at most 200 cps at 25°C, because, if it is too high, the viscosity of the solution prepared by dissolving the prescribed amount of the product in some organic solvent will be too high for the solution to be easily applied over the medicament. Consequently, a comparatively low polymerization cellulose ether should be esterified, or a monoester of a comparatively high polymerization cellulose ether should be reacted with acid or an oxidizing agent so that the polymerization degree may be reduced.

The derivative the cellulose ether employed in practicing the invention is obtained as dissolved in an organic solvent, the concentration of the solution being as high as from 10 to 20%, so that any of the generally employed coating methods, e.g., Wurster method, Cap method or Spray method may be employed, the most preferable one being the Pan-Spray method.

As organic solvents, one or more kinds are selected from the group consisting of methyl alcohol, ethyl alcohol, isopropyl alcohol, methyl cellosolve, ethyl cellosolve, dioxane, diethyl ether, acetone, methyl ethyl ketone, diacetylene alcohol, benzene, toluene, methyl lactate, methyl acetate, ethyl acetate, methylene chloride, trichloroethylene, methyl chloroform, chloroform, and ethylene chloride. For the purpose of improving the strength, elongation, gloss, moisture resistance, appearance and processability of the film, coating film or capsule, to be prepared of the coating agent, applying such cellulose ether derivatives, there may be added to it various additives such as plasticizers, e.g., diethyl phthalate, dibutyl phthalate, dimethyl phthalate, triacetin, monoacetin, diacetin, diethylene glycol, di-n-butyl tartrate, ethyl phthalyl ethyl glycollate, hydroxypropylglycerin and triphenyl phosphate; sugars; higher fatty acids and esters thereof, e.g., polyethylene glycol, ethylene oxide-propylene oxide copolymer, polypropylene glycol, stearic acid, abietic acid, and oleic acid; higher alcohols, e.g., cetyl alcohol, and lauryl alcohol; paraffins, amines, e.g., hexadecyl amine; various surface active agents; natural polymers, e.g., zein, shellac, balsam, casein, starch, rosin derivatives, and tragacanth gum; synthetic polymers, e.g., silicone, polyvinyl pyrrolidone, polyvinyl alcohol, polyvinyl acetate, polyacrylic acid, polyacrylic acid ester, polymethacrylic acid ester and polyethylene; cellulose derivatives, e.g., methyl cellulose, hydroxyethyl cellulose, hydroxypropyl cellulose, hydroxypropyl methyl cellulose, carboxy methyl cellulose, ethyl cellulose, cellulose nitrate, cellulose acetate, cellulose acetate phthalate, cellulose acetate succinate, cellulose acetate butyrate, methylcellulose phthalate, and ethylcellulose phthalate; and inorganic substances such as alumina, silica, calcium carbonate, kaolin, talc, calcium phosphate, boric acid, and sodium chloride; known coloring agents, deodorizing agents, and deseasoning agents. These additives may be mixed with said cellulose ether derivatives which are the main component of the enteric coating agent of the present invention before they are applied over the medicament, or the additives may be applied over the medicament followed by the application of the main coating component or in the reverse order.

In the following examples, parts and % are all parts and % by weight, and the artificial gastric fluid and the artificial intestinal fluid were prepared as follows:

1. Artificial gastric fluid:

To a mixture of 2 g of sodium chloride, 3.2 g of pepsin, and 24 cc of 10% HCl was added distilled water in such an amount that the total volume will be 1 liter, obtaining a solution whose pH was 1.2. This solution was employed at 37°C.

2. Artificial intestinal fluid:

To a mixture of 15 g of sodium bicarbonate, and 2.8 g of pancreatin was added distilled water in such an amount that the total volume will be 1 liter, obtaining a solution whose pH was 8.3. This solution was employed at 37°C.

The values of the properties given below were obtained by the following testing methods.

1. Solubility in organic solvents:

To 1 g of the sample were added 9 g of an organic solvent at 25°C, and the sample completely dissolved in the solvent was marked by S, the one which merely got swollen, by SW, and the one which was not dissolved at all, by IS.

2. Solubility in McIlvaine's buffer solution, in the artificial gastric fluid, and in the artificial intestinal fluid:

A 0.1 mm thick film was prepared of each sample, and 1 cm$^2$ of it was put in 50 ml (37°C) of the McIlvaine's buffer solution, or of the artificial gastric fluid or of the artificial intestinal fluid, and its solubility was tested in agitation.

3. Moisture permeation velocity (moisture permeability resistance test):

A 0.1 mm thick film was prepared of each sample, and employing it, the velocity at which vapor permeated it from the condition of R.H. 100% into the condition of R.H. 5%, both at 40°C, was measured by the weight increase of calcium chloride caused by its absorption of the vapor.

4. Stability:

4–1. Measurement of the quantity of free acetic acid:

A powdery sample placed in a tube and sealed was let to stand at 60°C and R.H.: 100% for a prescribed number of days, then it was cooled and a certain amount of the sample was taken out, from which, by means of Soxhlet extractor, free acetic acid was extracted in ethyl ether, and the ethyl ether solution of the acetic acid was subjected to quantity analysis by gas-chromatography in order to know the quantity of free acetic acid contained in the sample.

4–2. Measurement of the quantity of free acid:

A powdery sample placed in a tube and sealed was put under the same condition as described in (4–1), and a certain amount of it was taken out, and dissolved in a mixture of methylene chloride and ethanol (volumetric ratio: 2:3). After n-hexane was added to the solution, free acid was extracted from the solution in water, which was titrated with 0.1N sodium hydroxide, obtaining the total quantity of free acid from which the quantity of free acetic acid (obtained in (4–1)) was substracted in order to know the quantity of free acid contained in the sample.

CAP, MCP, CATHP and CAHHP employed in controls had the M.S. values as given below:

CAP: acetyl radical = 1.66, phthalyl radical = 0.75
MCP: methyl radical = 1.76, phthalyl radical = 0.71
CATHP: acetyl radical = 1.64, tetrahydrophthalyl radical = 0.73
CAHHP: acetyl radical = 1.62, hexahydrophthalyl radical = 0.75.

EXAMPLE 1

In a reactor equipped with a stirrer were put 100 parts of glacial acetic acid, 25 parts of anhydrous sodium acetate, dibasic acid anhydride (as given in Table 1) and 50 parts of various cellulose ethers (as given in Table 1), the viscosity of whose 2% aqueous solution at 25°C was 5 cps. These were reacted at 80°C for 5 hours. Subsequently, to the reaction product were added 800 parts of water, and the precipitate was the filtered off, washed with water, and dried at 60°C for 5 hours. The product obtained was dibasic acid monoester of various cellulose ethers, containing acyl radicals as shown in Table 1.

Table 1

| Exp. No. | Cellulose ether | | | Anhyydrous dibasic acid | | Product | |
|---|---|---|---|---|---|---|---|
| | Kind | Hydroxy-alkyl radical* | Alkyl radical* | Kind | Parts by weight | No. | Acyl radical* |
| 1 | HPC | 3.0 | 0 | Tetrahydrophthalic anhydride | 70 | A | 1.65 |
| 2 | HPC | 3.0 | 0 | Hexahydrophthalic anhydride | 70 | B | 1.60 |
| 3 | HPMC | 0.27 | 1.87 | Tetrahydrophthalic anhydride | 70 | C | 0.85 |
| 4 | HBMC | 0.10 | 1.80 | Tetrahydrophthalic anhydride | 70 | D | 0.75 |
| 5 | HPMC | 0.27 | 1.87 | Tetrahydrophthalic anhydride | 30 | E | 0.40 |
| | | | | Succinic anhydride | 20 | | 0.40 |
| 6 | HPMC | 0.27 | 1.87 | Hexahydrophthalic anhydride | 47 | F | 0.57 |
| | | | | Phthalic anhydride | 23 | | 0.23 |
| 7 | HPMC | 0.27 | 1.87 | Hexahydrophthalic anhydride | 30 | G | 0.41 |
| | | | | Trimellitic anhydride | 35 | | 0.35 |

(Note) The figures marked with * show the M.S. numbers.

Solubilities in organic solvents, in the artificial gastric fluid, in the artificial intestinal fluid, and in the McIlvaine's buffer solution, moisture permeability resistances and stabilities of the products thus synthesized (A, B, C, D, E and F) were measured and given in Tables 2, 3 and 4, in comparison with those of generally known CAP, MCP, CATHP and CAHHP.

Table 2.

Solubilities of the products in organic solvents, the artificial gastric fluid, the artificial intestinal fluid and the McIlvaine's buffer solution

| Solvent \ Sample | A | B | C | D | E | F | G | CAP | MCP |
|---|---|---|---|---|---|---|---|---|---|
| Acetone | S | S | S | S | S | S | S | S | SW |
| Methanol | S | S | S | S | S | S | S | IS | IS |
| Methylene chloride | S | SW | S | S | SW | SW | SW | IS | IS |
| Ethyl acetate (1:1) | S | SW | S | S | SW | SW | SW | SW | IS |

Table 2.—Continued

Solubilities of the products in organic solvents, the artificial gastric fluid, the artificial intestinal fluid and the McIlvaine's buffer solution

| Solvent \ Sample | A | B | C | D | E | F | G | CAP | MCP |
|---|---|---|---|---|---|---|---|---|---|
| Acetone-methanol | S | S | S | S | S | S | S | S | S |
| Methylene chloride-methanol | S | S | S | S | S | S | S | S | S |
| Artificial gastric fluid (pH: 1.2) | IS | IS | IS | IS | IS | IS | IS | IS | IS |
| Artificial intestinal fluid (pH: 8.3) | S | S | S | S | S | S | S | S | S |
| pH of the product at which the product begins to get dissolved in the McIlvaine's buffer solution | 7.0 | 7.0 | 7.0 | 7.0 | 5.8 | 6.4 | 5.6 | 6.0 | 6.0 |

Table 3.

Results of the moisture permeability resistance test on the products

| Test | | Velocity at which moisture permeated the product (g/cm².24 hrs) |
|---|---|---|
| E | A | 0.0020 |
| X | B | 0.0016 |
| A | C | 0.0130 |
| M | D | 0.0110 |
| P | E | 0.0142 |
| L | F | 0.0098 |
| E | G | 0.0145 |
| Control | CAP | 0.0222 |
| | MCP | 0.0236 |

Table 4. Results of the stability test on the products

| Sample No. of days elapsed | Quantity of free acid generated | | | | | | | | | |
|---|---|---|---|---|---|---|---|---|---|---|
| | Example | | | | | | | Control | | |
| | A | B | C | D | E | F | G | CAP | CAHHP | CATHP |
| 0 | 1.2 (0) | 1.1 (0) | 0.6 (0) | 0.5 (0) | 0.5 (0) | 1.5 (0) | 1.2 (0) | 1.0 (0.2) | 1.6 (0) | 1.4 (0) |
| 1 | 1.5 (0) | 1.6 (0) | 1.2 (0) | 0.8 (0) | 1.0 (0) | 2.1 (0) | 2.1 (0) | 2.5 (1.4) | 2.8 (0.7) | 2.5 (0.8) |
| 2 | 2.0 (0) | 2.2 (0) | 1.9 (0) | 1.4 (0) | 1.7 (0) | 2.7 (0) | 3.0 (0) | 4.0 (3.1) | 3.5 (1.4) | 3.2 (1.4) |
| 5 | 3.0 (0) | 3.3 (0) | 2.9 (0) | 2.3 (0) | 2.5 (0) | 3.7 (0) | 3.9 (0) | 6.2 (5.6) | 4.6 (3.1) | 4.4 (2.9) |
| 10 | 4.2 (0) | 4.4 (0) | 3.5 (0) | 3.2 (0) | 3.4 (0) | 4.6 (0) | 4.7 (0) | 9.0 (8.0) | 6.8 (4.8) | 6.2 (4.5) |
| 15 | 4.2 (0) | 4.5 (0) | 3.5 (0) | 3.2 (0) | 3.4 (0) | 4.7 (0) | 4.9 (0) | 10.8 (11.2) | 8.9 (6.6) | 8.3 (6.3) |

(Note) The figures coming under the heading of 0 day show the results of the blank test, and those in the table show the quantity (in %) of free acid and those in the brackets, the quantity (in %) of free acetic acid.

Thus Tables 2, 3 and 4 show that the products of the invention are superior to the known substances in solubility in organic solvents, in moisture permeability resistance, and in stability, which are very useful properties required of protective coating agents for medicaments soluble in the intestines.

EXAMPLE 2

Employing the products, A, B, C, D, E, F and G, prepared in Example 1, coating tests were conducted the Pan-Spray method. The compositions of the coating liquids were as given in Table 5.

In a coating pan of the size of 310 mm, and operated at the rate of 36 rpm, were put 1.7 kg of uncoated tablets, each weighing 200 mg and 10 mm in diameter, and with a 2.5 mm φ spray gun nozzle, coating was conducted for 5 hours at a cycle of 10 seconds of spraying the tablets with the liquid (temperature: 50°C), and drying them for 15 seconds at 55°C under the air pressure of 5 kg/cm². The total quantity of the liquid used on each sample was 2.8 kg, and the weight of the finished product was 1.86 kg. The weight of coating per tablet was 20 mg, and the coating efficiency was 57%. During the coating process, there was no trouble of the tablets sticking to each other or to the walls of the coating pan. None of the samples thus prepared got dissolved in the artificial gastric fluid (pH: 1.2) but were dissolved in the artificial intestinal fluid within 10 minutes.

Table 5.

Composition of the coating liquid

| Base (A, B, C, D, E, F or G) | 85 parts |
|---|---|
| Acetylmonoglyceride | 1.5 parts |
| Aerosil | 0.5 part |
| Titanium white | 0.5 part |
| Acetone | 30.0 parts |
| Ethylcellosolve | 60.0 parts |

EXAMPLE 3

Employing C, F and G prepared in Example 1, medicaments which would dissolve gradually as they go through the intestines in accordance with the rise in pH of the intestinal fluid with which they come in contact were prepared as follows.

The bases employed were:
1. C
2. A mixture of C and F (1:1)
3. F
4. A mixture of F and G (1:1)
5. G Coating liquids were prepared of each of the above-given bases and other components as given in Table 6, and by Wurster flow-coating apparatus, granular medicament (diameter of each granule: 1.2 mm) was coated 0.7 mm thick with one of the 5 kinds of the coating liquids thus prepared, obtaining 5 kinds of granules, which were mixed in equivalent ratio to prepare an intestinal dissolving, long-lasting medicament.

When the granular medicament thus prepared was put in the artificial gastric fluid and shaken for two hours, no change was observed to take place in it, so after it was taken out, it was put in the McIlvaine's buffer solution or the artificial intestinal fluid and shaken for 60 minutes, and the remaining granules were dried and weighed, obtaining the results (shown in % by weight) given in Table 7.

Table 6.

| Composition of the coating liquid | |
|---|---|
| Base | 5 parts |
| Dibutyl phthalate | 0.8 part |
| Titanium white | 0.1 part |
| Pigment (Edible pigment, Yellow No. 4 Aluminum lake) | 0.05 part |
| Silicone oil | 0.05 part |
| Acetone | 40 parts |
| Ethylcellosolve | 55 parts |

Table 7.

| Testing solution | Results of the disintegration test | Retained granules (%) |
|---|---|---|
| McIlvaine's buffer solution pH | 5.0 | 97.0 |
| | 5.4 | 81.5 |
| | 5.8 | 60.3 |
| | 6.2 | 45.2 |
| | 6.6 | 23.8 |
| | 7.0 | 0 |
| Artificial intestinal fluid | 8.3 | 0 |

What is claimed is:

1. A coating composition consisting essentially of a solution of an organic solvent and at least one monoester selected from the group consisting of a tetrahydrophthalic acid monoester and hexahydrophthalic acid monoester of a cellulose ether represented by the general formula $$R^1_m R^2_n A$$

wherein $R^1$ is a hydroxyl alkyl radical having three to four carbon atoms, $R^2$ is selected from the group consisting of hydrogen and alkyl radicals of one to two carbon atoms, $m$ and $n$ are positive integers, and A is a cellulose residue.

2. The composition of claim 1, wherein $R^1$ in said general formula is a hydroxyalkyl radical, the number of the substitution moles per anhydrous glucose unit of which is from 0.2 to 5.0, and $R^2$ in said general formula is hydrogen.

3. The composition of claim 1, wherein said cellulose ether is selected from the group consisting of hydroxypropyl cellulose, hydroxybutyl methylcellulose, hydroxypropyl methylcellulose, hydroxybutyl cellulose, and hydroxypropyl ethylcellulose.

4. The compostion of claim 1, wherein said monoester is a hexahydrophthalic acid monoester of hydroxypropyl cellulose.

5. The composition of claim 1, wherein said monoester is a tetrahydrophthalic acid monoester of hydroxypropyl cellulose.

6. The composition of claim 1, wherein said monoester is a tetrahydrophthalic acid monoester of hydroxypropyl methylcellulose.

7. The composition of claim 1, wherein the monoester is a tetrahydrophthalic acid monoester of hydroxybutyl methylcellulose.

8. The composition of claim 1, wherein said organic solvent is selected from the group consisting of methyl alcohol, ethyl alcohol, isopropyl alcohol, methyl cellosolve, ethyl cellosolve, dioxane, diethyl ether, acetone, methyl ethyl ketone, diacetylene alcohol, benzene, toluene, methyl lactate, methyl acetate, ethyl acetate, methylene chloride, trichloroethylene, methyl chloroform, chloroform, and ethylene chloride.

9. The coating composition of claim 1 wherein the composition consists essentially of said organic solvent and 10–20% of said monoester.

10. A coating composition consisting essentially of a solution of an organic solvent and a mixed ester of tetrahydrophthalic acid or hexahydrophthalic acid and another dibasic acid or tribasic acid of a cellulose ether represented by the general formula $$R^1_m R^2_n A$$

wherein $R^1$ is a hydroxyl alkyl radical having three to four carbon atoms, $R^2$ is selected from the group consisting of hydrogen and alkyl radicals of one to two carbon atoms, $m$ and $n$ are positive integers, and A is a cellulose residue.

11. The composition of claim 10, wherein $R^1$ in said general formula is a hydroxyalkyl radical, the number of the substitution moles per anhydrous glucose unit of which is at least 0.2, and $R^2$ in said general formula is an alkyl radical, the total number of the substitution moles per anhydrous glucose unit of said hydroxyalkyl and alkyl radicals being from 0.5 to 5.0.

12. The composition of claim 10, wherein said cellulose ether is selected from the group consisting of hydroxypropyl cellulose, hydroxybutyl methylcellulose, hydroxypropyl methylcellulose, hydroxybutyl cellulose, and hydroxypropyl ethylcellulose.

13. The composition of claim 10, wherein said dibasic acid is selected from the group consisting of phthalic acid and succinic acid.

14. The composition of claim 10, wherein said tribasic acid is a trimellitic acid.

15. The composition of claimed in claim 10, wherein the mixed ester is mixed ester of tetrahydrophthalic acid and succinic acid of hydroxypropyl methylcellulose.

16. The composition of claimed in claim 10, wherein the mixed ester is mixed ester of hexahydrophthalic acid and phthalic acid of hydroxypropyl methylcellulose.

17. The composition of claimed in claim 10, wherein the mixed ester is mixed ester of hexahydrophthalic acid and trimellitic acid of hydroxypropyl methylcellulose.

18. The composition of claim 10, wherein said organic solvent is selected from the group consisting of methyl alcohol, ethyl alcohol, isopropyl alcohol, methyl cellosolve, ethyl cellosolve, dioxane, diethyl ether, acetone, methyl ethyl ketone, diacetylene alcohol, benzene, toluene, methyl lactate, methyl acetate, ethyl acetate, methylene chloride, trichloroethylene, methyl chloroform, chloroform, and ethylene chloride.

19. The coating composition of claim 10, wherein said composition consists essentially of said organic solvent and 10–20% of said mixed ester.

* * * * *